May 20, 1958
J. NAAB
2,835,518
ROTARY SHAFT DRIVING CONNECTION
Filed March 17, 1954
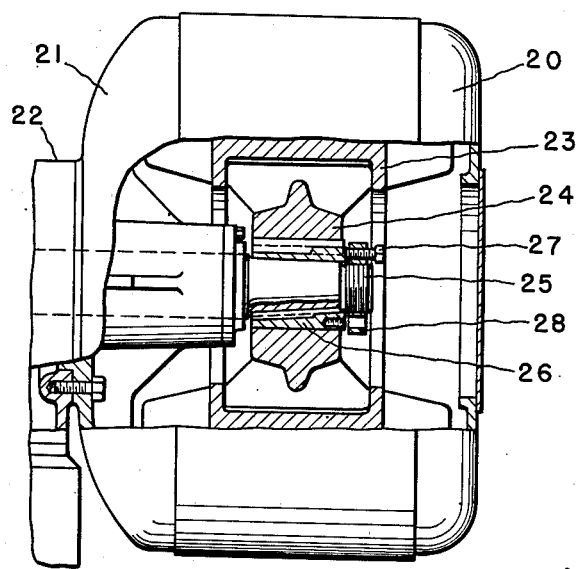
FIG. 1
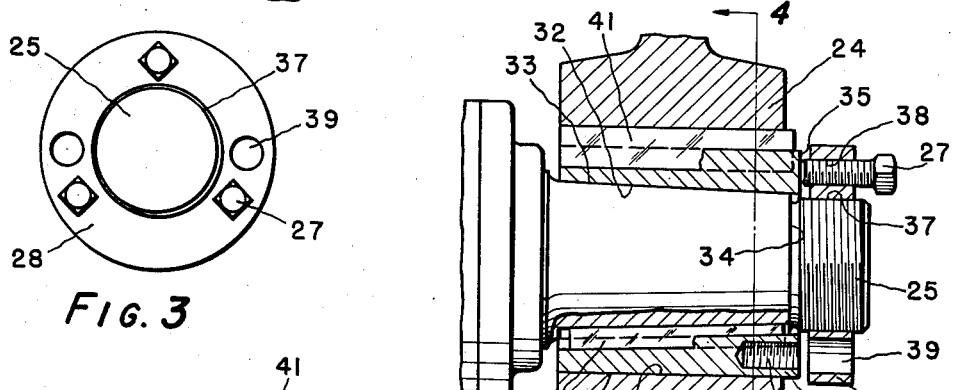
FIG. 3
FIG. 2
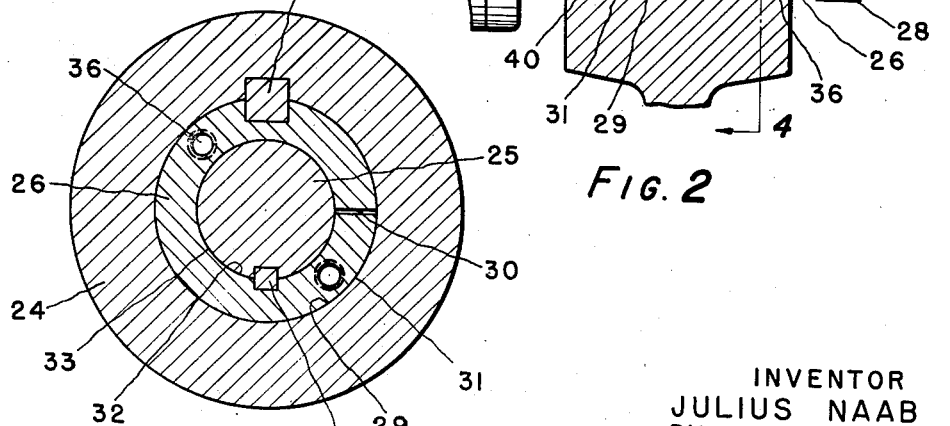
FIG. 4
INVENTOR
JULIUS NAAB
BY
HIS ATTORNEY

United States Patent Office 2,835,518
Patented May 20, 1958

2,835,518
ROTARY SHAFT DRIVING CONNECTION

Julius Naab, Easton, Pa., assignor to Ingersoll-Rand Company, New York, N. Y., a corporation of New Jersey Application March 19, 1954, Serial No. 417,461

1 Claim. (Cl. 287—52.06)

This invention pertains to rotary shaft driving connections.

More particularly it relates to demountable shaft driving connections wherein a split sleeve is forced into locking engagement with a shaft and a member to form a rigid connection.

One object of the invention is to provide a demountable shaft driving connection that permits of immediate accurate alignment of a member relative to a shaft during assembly of a split clamping sleeve.

Another object is to provide clamping means for securely locking a rotor to a shaft that is easily and quickly assembled and disassembled.

A further object is to provide a close-coupled locking device in which the clamping surfaces are close to the shaft axis thereby eliminating any warpage of the parts and resulting unbalance.

A still further object is to provide a shaft connection of simplified and inexpensive construction.

Other objects will be in part obvious and in part pointed out hereinafter.

The accompanying drawings illustrate a preferred embodiment of the invention in which similar numerals refer to similar parts in the several views.

Fig. 1 is a side elevation, partly in section, showing a portion of a machine, a motor stator directly mounted thereto and the motor rotor clamped on the crankshaft, Fig. 2 is an enlarged cross sectional view of the drive connection, Fig. 3 is an end view of the locking nut showing the angular relationship of the holes, and Fig. 4 is a cross sectional view through the connection taken on the line 4—4 in Fig. 2 looking in the direction of the arrows.

Referring to Fig. 1 of the drawings, the motor 20 shown, having a stator 21 mounted directly to a bed-plate 22, includes a rotor 23 with a hub 24 which is locked to the shaft 25 by a tapered split sleeve 26 wedged between the hub 24 and the shaft 25 by several jack screws 27 in a nut 28 mounted on the shaft 25.

Referring more particularly to Fig. 2 the embodiment of the invention is shown applied to the hub 24 provided with a straight bore 29. Contained within the hub is the sleeve 26 longitudinally split on one side for its full length by the saw cut 30 of sufficient width to allow the sleeve 26 to contract the necessary amount when pressed in the hub bore 29 as hereinafter described.

The outer surface 31 of the sleeve 26 is machined to a light press fit in the hub bore 29 so as to remain practically a cylindrical surface when pressed into the clamped position.

Sleeve 26 is provided with a tapered bore 32 of small angle, which matches a correspondingly tapered surface 33 on the shaft 25 with its small diameter 34 toward the outer end of the shaft relative to the bed-plate 22. The outer end of the sleeve 26 consists of a radially flat surface 35 containing two tapped holes 36 whose axes are parallel to the axis of the sleeve and located at diametrically opposite points.

Adjacent to the tapered portion 33 is a threaded portion 37 on the outer end of the shaft 25 of smaller diameter than the small end 34 of the tapered portion 33 and on which is mounted the circular nut 28 in spaced relation to the flat surface 35 on the sleeve 26.

Nut 28 is provided with three axially extending threaded holes 38 equally spaced at a common radius from the shaft axis as shown in Fig. 3. Extending through the threaded holes 38 are three square headed jack screws 27 operatively engaging the flat surface 35 on the sleeve 26 to force said sleeve into locking engagement with the shaft 25 and the hub 24. Also contained in the nut 28 are two diametrically opposite clearance holes 39 with their axes parallel to the axis of the nut, angularly spaced relative to the threaded holes 38 as shown in Fig. 3 and so located as to be alignable with the tapped holes 36 in the sleeve 26, when the nut 28 is rotated to the proper position on shaft 25.

Two conventional keys 40 and 41 are provided as shown in Fig. 4 at the tapered joint between the shaft 25 and the sleeve 26 and at the straight joint between the sleeve 26 and the hub 24, permitting axial movement between the above mentioned parts but preventing any relative rotation therebetween.

The aforementioned parts embodying the invention cooperate in following manner. During the assembly operation, the sleeve 26 is pushed most of the way into the bore 29 of the hub 24 with the key 41 in place. The light press fit between the surfaces 29 and 31 eliminates any possibility of clearance between them and holds the sleeve 26 in place temporarily. The rotor 23 with the hub 24 and the sleeve 26 is then passed over the tapered portion 33 of the shaft 25 and the key 40 to the desired axial location relative to the shaft. Nut 28 is then screwed onto the threaded portion 37 of the shaft 25 to a predetermined position allowing sufficient clearance between the nut and the sleeve 26. The screws 27 are then inserted in the threaded holes 38, and while the rotor 23 is held in the desired axial position, they are screwed against the end face 35 until the split sleeve 26 is pushed against the tapered portion 33 and is forced to expand and tightly grip the hub 24 and the shaft 25, at the same time locking the nut 28 against the threaded portion 37. Thus the shaft, sleeve and hub are united into a rigid driving connection serving to transmit power from the rotor 24 to the shaft 25.

To remove the rotor from the shaft, the screws 27 are backed away from the end surface 35 so that the nut 28 may be unscrewed sufficiently to bring the holes 36 and 39 into alignment. Two of the screws 27 are then removed from the threaded holes 38, inserted through the clearance holes 39 into the tapped holes 36 and screwed in until the heads bear against the nut 28. They are further tightened until the sleeve 26 is drawn free and forced to break its grip on the hub 24 and the shaft 25. Thereupon, the screws 27 may be unscrewed from the sleeve 26 and removed from the nut 28, the nut turned off the shaft 25 and the whole unit removed from the shaft.

It is understood that such a connection may be applied to any combination of rotors, pulleys, sheaves and wheels mounted on a rotary shaft in driving or driven relation.

In addition to constituting a rigid and inexpensive coupling, it allows of the quick assembly and disassembly of a rotor on a shaft. And it has the further advantage of permitting a rotor to be held in correct axial alignment with a shaft, while being clamped in that position by a split sleeve forced between them by jack screws in a nut mounted on the shaft and acting as an abutment independent of the sleeve.

I claim:

In a shaft driving connection, the combination of a rotary member with a hub having a cylindrical bore, a shaft comprising a tapered portion and an end portion of reduced diameter adjacent the small end of the tapered portion, a longitudinally split sleeve member with a cylindrical outer shape of substantially constant diameter throughout its length slidably fittable in said hub bore and a tapered bore adapted to fit the tapered shaft portion, a collar adjustably secured against longitudinal movement on said end portion, said sleeve member having one end adjacent the collar, and screws mounted in the collar and wholly within the circular plane of the periphery of the sleeve member to engage said end of the sleeve member to force the sleeve member between the shaft and hub into clamping engagement to form a rigid driving connection, said sleeve member having threaded holes longitudinally disposed in the end adjacent the collar, said collar having holes in axial alignment with said sleeve member holes such that said screws may be selectively passed through the collar to threadedly engage said end of the sleeve member to ease the clamping engagement of the sleeve member between the shaft and the hub and to permit said rotary member to be completely withdrawn from the sleeve member while the sleeve member is disposed around the tapered shaft portion.

References Cited in the file of this patent

UNITED STATES PATENTS

| | | |
|---|---|---|
| 123,413 | Newell | Feb. 5, 1872 |
| 319,968 | Fish | June 16, 1885 |
| 1,437,471 | Kirkham | Dec. 5, 1922 |
| 1,561,507 | Clark | Nov. 17, 1925 |
| 2,010,451 | Browning | Aug. 6, 1935 |
| 2,190,371 | Taylor | Feb. 13, 1940 |
| 2,381,697 | Shepard | Aug. 7, 1945 |
| 2,554,348 | Rudolph | May 22, 1951 |